(12) United States Patent
Jääskeläinen

(10) Patent No.: US 9,612,144 B2
(45) Date of Patent: Apr. 4, 2017

(54) METHOD AND ARRANGEMENT FOR MEASURING FLOW RATE OF OPTICALLY NON-HOMOGENOUS MATERIAL

(75) Inventor: Juha Jääskeläinen, Vantaa (FI)

(73) Assignee: JANESKO OY, Vantaa (FI)

( * ) Notice: Subject to any disclaimer, the term of this patent is extended or adjusted under 35 U.S.C. 154(b) by 651 days.

(21) Appl. No.: 13/604,343

(22) Filed: Sep. 5, 2012

(65) Prior Publication Data

US 2013/0057675 A1   Mar. 7, 2013

(30) Foreign Application Priority Data

Sep. 6, 2011 (FI) .................................. 20115873

(51) Int. Cl.
*G01F 1/708* (2006.01)
*G01P 5/22* (2006.01)

(52) U.S. Cl.
CPC .............. *G01F 1/7086* (2013.01); *G01P 5/22* (2013.01)

(58) Field of Classification Search
CPC ............................................. A01J 5/01–5/135
USPC ................................................. 356/28–28.5
See application file for complete search history.

(56) References Cited

U.S. PATENT DOCUMENTS

| | | |
|---|---|---|
| 4,631,400 A | 12/1986 | Tanner et al. |
| 4,664,513 A | 5/1987 | Webb et al. |
| 4,978,863 A | 12/1990 | Lyons et al. |
| 5,179,418 A * | 1/1993 | Takamiya ............ G01S 17/58 356/28.5 |
| 5,365,326 A | 11/1994 | Chrisman et al. |
| 5,610,703 A | 3/1997 | Raffel et al. |
| 5,701,172 A * | 12/1997 | Azzazy ................ G01P 5/26 356/28 |
| 6,275,284 B1 | 8/2001 | Kiel et al. |
| 6,653,651 B1 | 11/2003 | Meinhart et al. |
| 2007/0289536 A1* | 12/2007 | Dunn .................. A01J 5/01 119/14.14 |
| 2008/0200865 A1 | 8/2008 | Bedingfield |

(Continued)

FOREIGN PATENT DOCUMENTS

| | | |
|---|---|---|
| DE | 43 13 682 A1 | 10/1994 |
| DE | 10 2007 034 152 A1 | 1/2009 |

(Continued)

OTHER PUBLICATIONS

Office Action issued on Oct. 29, 2014, by the German Patent Office in corresponding German Patent Application No. 10 2012 215 415.9. (9 pages).

(Continued)

*Primary Examiner* — Luke Ratcliffe

(74) *Attorney, Agent, or Firm* — Buchanan Ingersoll & Rooney PC

(57) ABSTRACT

A method and arrangement are disclosed for measuring a flow rate of optically non-homogeneous material in a process pipe. The non-homogeneous material can be illuminated through a window. Images are taken with a camera, through a window, of illuminated non-homogeneous material. Correlation between temporally successive images determines travel performed by the non-homogeneous material in the process pipe between capture of temporally successive images. Velocity of the non-homogeneous material is determined by the time difference between the successive images and the travel.

14 Claims, 3 Drawing Sheets

(56) References Cited

U.S. PATENT DOCUMENTS

2008/0297763 A1    12/2008  Herzberg et al.
2010/0235117 A1*    9/2010  Melnyk et al. ................. 702/49

FOREIGN PATENT DOCUMENTS

JP          63-184070 A     7/1988
WO          WO 01/51897 A1  7/2001

OTHER PUBLICATIONS

Finnish Search Report for FI 20115873 dated Jan. 19, 2012.

* cited by examiner

Fig. 3A  Fig. 3B  Fig. 3C
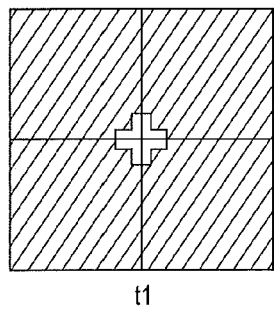
t1
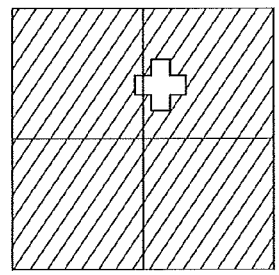
t2
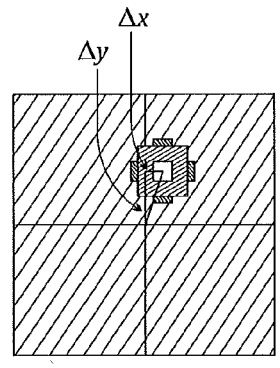
Correlation
Travel time between t2 - t1 is obtained at the maximum point of correlation
Instantaenous speed $\quad v = \dfrac{\sqrt{\Delta x^2 + \Delta y^2}}{\Delta t}$
Angle of motion $\quad \theta = \arctan\left(\dfrac{\Delta x}{\Delta y}\right)$
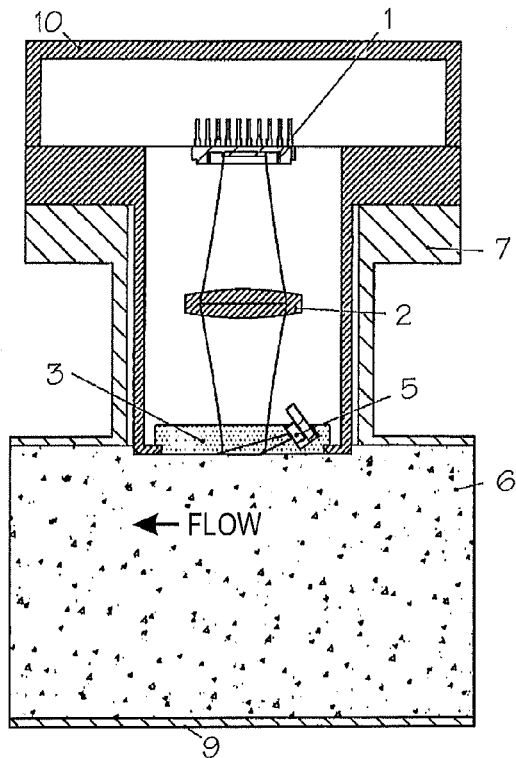
Fig. 4

METHOD AND ARRANGEMENT FOR MEASURING FLOW RATE OF OPTICALLY NON-HOMOGENOUS MATERIAL

RELATED APPLICATION(S)

This application claims priority under 35 U.S.C. §119 to Finnish Patent Application No. 20115873 filed on Sep. 6, 2011, the entire content of which is hereby incorporated by reference in its entirety.

FIELD

The disclosure relates to a method for measuring a flow rate of optically non-homogeneous material in a process pipe, such as a method wherein the optically non-homogeneous material in the process pipe is illuminated through a window. The disclosure also relates to an arrangement for measuring a flow rate of optically non-homogeneous material in a process pipe. The arrangement can include a light source that is arranged to illuminate the non-homogeneous material in the process pipe through a window.

BACKGROUND INFORMATION

Measurement of various flows, for example, slow ones, in a process pipe can be difficult. One example of the measurement of slow flows is the measurement of flows occurring in connection with a bleaching reactor and passing at a rate of about 1 m/min. Problems can arise from measuring devices immersed in the flow disturbing the flow locally, and consequently the measurement result may not be reliable.

When the operation of the bleaching reactor is monitored, an object is to find out the rate of pulp pumped in the reactor from below upwards in the periphery of a reactor tower. This information can be important because the reactor can malfunction, in which the flow in the tower is channeled in such a manner that the pulp flows faster in the center of the reactor as compared with the flow in the border areas. In that case part of the pulp dwells longer in the reactor and can cause variations in bleaching results.

Currently, there are no commercially available measuring devices suitable for monitoring a bleaching reactor. Known technology allows channeling to be examined by adding a tracer in the flow and monitoring its travel time. A drawback with this method is that the tracer ends up in the final product. A further drawback is that the signal produced by the tracer spreads quickly, as the substance mixes in the reactor, and thus the velocity information deteriorates. Instead of a tracer it is also possible to use a temperature pulse, provided by water, whose travel in the reactor is monitored by thermometers mounted in the reactor. A problem with this technology is that the signal can spread and fade quickly as the pulp is mixed.

SUMMARY

A method is disclosed for measuring a flow rate of optically non-homogeneous material in a process pipe, the method comprising: illuminating the optically non-homogeneous material in the process pipe through a window that is in contact with the non-homogeneous material; imaging with a camera, through the window, illuminated non-homogeneous material in the process pipe; determining through correlation between temporally successive images, travel performed by the non-homogeneous material in the process pipe between capture of temporally successive images; and determining a velocity of the non-homogeneous material in the process pipe by a time difference between the successive images and the travel.

An arrangement is disclosed for measuring a flow rate of optically non-homogeneous material in a process pipe, comprising: a light source for illuminating non-homogeneous material in the process pipe through a window that will contact with the non-homogeneous material during measurement; a camera for imaging, through a window, illuminated non-homogeneous material in the process pipe; and means for determining, through correlation between temporally successive images, travel performed by the non-homogeneous material in the process pipe between capture of temporally successive images and for determining a velocity of the non-homogeneous material in the process pipe by a time difference between the successive images and the travel.

BRIEF DESCRIPTION OF THE DRAWINGS

The disclosure will be explained in the following in more detail by application examples described in the attached drawing, in which

FIGS. 3a to 3c show the principle of velocity measurement based on correlation;

FIG. 4 is a schematic side view of a second exemplary embodiment of the arrangement of the disclosure;

FIGS. 1 and 2 show an application of an exemplary embodiment of the disclosure and FIGS. 3a to 3c show the principle of velocity measurement based on correlation.

DETAILED DESCRIPTION

Figure 1:
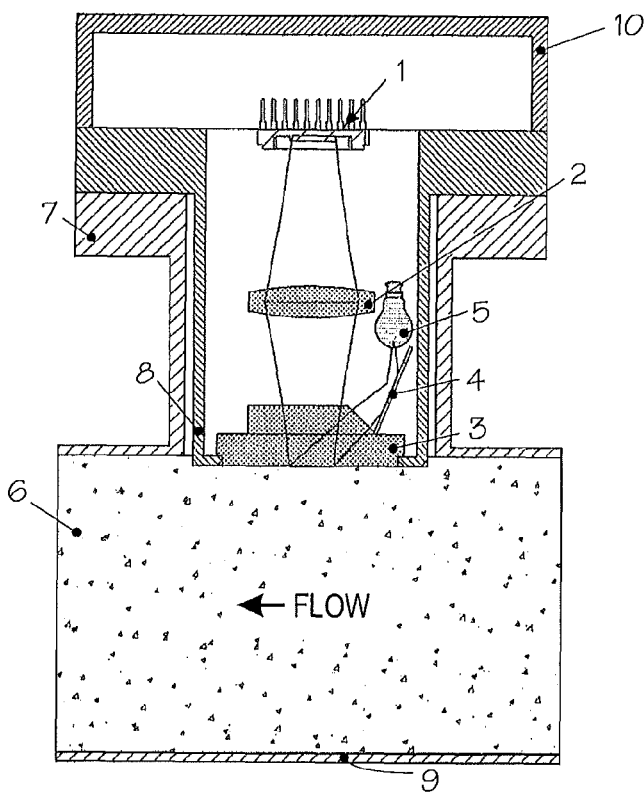
FIG. 1 is a schematic side view of a first exemplary embodiment of the arrangement of the disclosure.

Exemplary embodiments of the disclosure provide a method and arrangement for taking pictures with a camera, through a window, of illuminated non-homogeneous material in a process pipe and by determining through correlation between temporally successive images, the travel performed by the non-homogeneous material in the process pipe between the capture of temporally successive images and by determining the velocity of the non-homogeneous material in the process pipe by the time difference between the successive images and the travel. The arrangement of the disclosure includes a camera that is arranged to take pictures, through a window, of illuminated non-homogeneous material in the process pipe and can determine, through correlation between temporally successive images, the travel performed by the non-homogeneous material in the process pipe between the capture of temporally successive images and to determine the velocity of the non-homogeneous material in the process pipe by the time difference between the successive images and the travel.

According to exemplary embodiments of the disclosure monitoring of a bleaching reactor, for example, can be implemented in a reliable manner. An exemplary advantage of the embodiment is also its simplicity, which makes the adoption and use of the disclosure desirable.

When measuring techniques are considered, it can be stated that in the determination of velocity known methods employ the correlation between two signals collected at different locations. These are described, for instance, in U.S. Patent Application Publication No. 2010/0235117 and in U.S. Pat. No. 6,275,284. The disclosures in the above publications are intended for measuring gas flow rate. It is desired in these that light permeates the material to be measured when travelling from a light source to a detector. This method does not work, if a particle suspension is opaque, for example, if the suspension is poorly, or not at all, transparent to light.

There is also a known flow measurement utilizing back scattering, in which correlation between measuring points is utilized. This is disclosed in U.S. Pat. No. 4,978,863, for example. This employs a few measuring points for calculating the correlation. The principle is relatively complicated.

The above methods and apparatus are not applicable for measuring such optically non-homogeneous materials that are substantially opaque, in other words, such materials that are poorly transparent to light or non-transparent.

When measuring technique is considered in very broad terms, it can be stated that the use of correlation between successive images in the measurement of transfer and velocity is disclosed, for example, in an optical mouse. See U.S. Pat. No. 4,631,400.

Thus, exemplary embodiments of the disclosure relate to measurement of substantially optically non-homogeneous material in the process pipe. The measurement is based on the use of illumination and a camera and on the determination of velocity carried out by a correlation between temporally successive images. The optically non-homogeneous material to be measured should contain an ingredient that reflects back to the camera. Clear, transparent liquids can be measured by adding, for instance, air to the liquid, whereby air bubbles act as the ingredient that reflects back to the camera.

Figure 2:
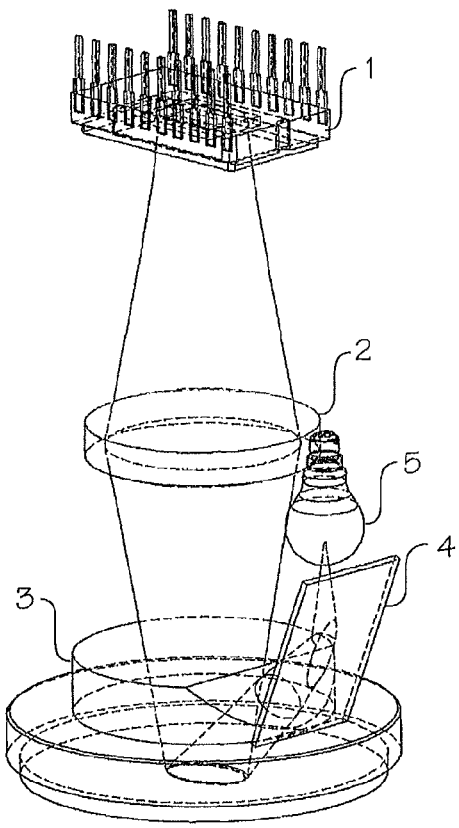
FIG. 2 is a perspective view, in principle, of the relevant parts of the embodiment of FIG. 1.

In FIGS. 1 and 2, reference numeral 1 denotes a camera and reference numeral 2 denotes an objective lens. Reference numeral 3 refers to a window, for example, a measuring window, which can also be provided with a prism, and reference numeral 4 refers to a mirror. In FIGS. 1 and 2, reference numeral 5 denotes a light source. The material to be measured, in this case a suspension to be measured, is denoted by reference numeral 6. Suspension flow is indicated by an arrow in FIG. 1. Reference numeral 7 denotes a process connection and reference numeral 8 denotes a point of the measuring device. Reference numeral 9 denotes a process pipe and reference numeral 10 a protective casing. The term process pipe should be understood broadly in this connection, for example, the process pipe can also be a container.

In the disclosure the flow rate is measured by an optical method, in which a particle suspension 6 in the process pipe 9 is illuminated through a window 3 by at least one light source 5. Through the window 3 the camera 1 takes images at a high rate. The frequency of max. 6400/s can be given as an example of high rates. By the correlation between temporally successive images it can be possible to determine the travel made by the suspension 6 from one picture taking moment to another. The time difference and the travel allow the calculation of the speed. FIGS. 3a to 3c show the above details. The travel between t2 and t1 is obtained at the maximum point of the correlation. Instantaneous speed and an angle of motion, for example, direction of motion, are obtained by dependencies set forth in connection with FIGS. 3a to 3c.

Thus, a two-dimensional correlation is concerned, for example, the camera takes a large number of pictures and the correlation between successive images is measured. The correlation provides course and distance between the images. High correlation indicates similarity of the pictures.

The window 3 is installed in the process pipe or container in such a manner that it does not disturb the flow. As stated above, the camera 1 provides a two-dimensional image of the suspension, so at the same time the direction of motion will also be determined in two dimensions. The measuring of rate will work, if the flow is sufficiently laminar. A flow of this kind is, for example, a so-called plug flow of chemical pulp in wood-processing industry. The quality of the measurement signal can also be used as an indicator of turbulence.

The embodiments of FIGS. 1 and 2 employ a probe-like structure, in which the measuring device is pushed through a process connector 7 serving as a process connecting piece and the window is at the point 8 of the measuring device, substantially on the surface level of the process pipe or the container 9 in order not to disturb the flow. In this embodiment, illumination is provided by using a plane mirror 4 and a bevel cut part of the window 3.

In another exemplary embodiment of the disclosure it is possible to implement the light source, for example, by bringing it to the bevel cut surface of the window. An application of this kind is shown in FIG. 4. The application of FIG. 4 differs from the application of FIGS. 1 and 2 only as regards the light source, in other respects the above applications correspond to one another. The same reference numerals are used in FIG. 4 as in FIGS. 1 and 2 to refer to the corresponding parts.

Figure 5:
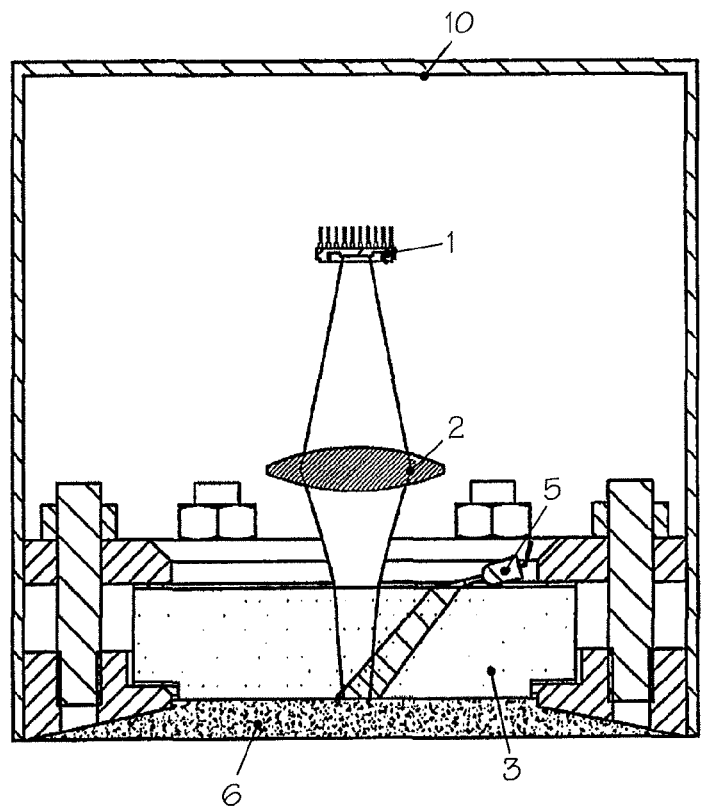
FIG. 5 is a schematic side view of a third exemplary embodiment of the arrangement of the disclosure.
Figure 6:
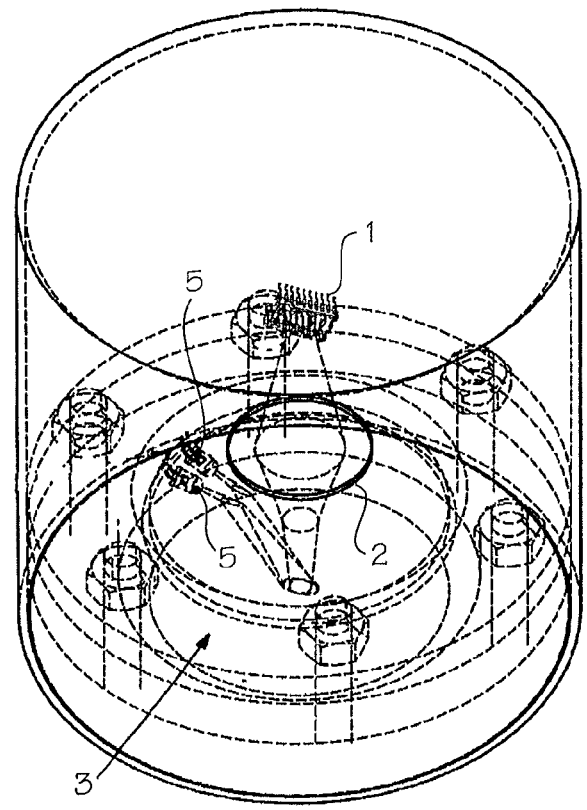
FIG. 6 is a perspective view, in principle, of the embodiment of FIG. 5.

FIGS. 5 and 6, in turn, show an application, in which a viewing glass located in the pipe or container is used as a measuring window. Devices to be used for measuring, for example, the camera 1, the objective lens 2, etc., have been brought close to the viewing glass and arranged inside a protective casing 10. The same reference numerals are used in FIGS. 5 and 6 as in FIGS. 1, 2 and 4 to refer to the corresponding parts.

In the above-described applications, the light source 5 used can be any light source, for example, a light emitting diode. There can be one or more light sources 5, however, in such a manner that they all illuminate substantially the same area that is imaged with the camera 1. FIG. 6 shows an application, in which a plurality of light sources 5 is used. It is beneficial that the measuring area is illuminated as uniformly as possible, because in calculating the correlation the parts illuminated with higher light intensity deceptively produce a higher value in correlation without the images being significantly similar at the points. The error can be compensated for mathematically but in practice the compensation may not be complete.

The camera 1 is to be such that it allows imaging at high rate, so that successive images captured of a flowing suspension partly depict the same area. The earlier mentioned 6400/s can be given as an example of high shooting rates. Appearance of the same area in the successive images is substantial, because the disclosure requires that a two-dimensional correlation be calculated between the images, from the maximum point of which correlation it is possible to calculate the distance the suspension has travelled during the time from one imaging moment to another. The camera speed defines how fast a measurable flow can be.

The surface area covered by an imaging objective lens 2 is illuminated with a light source 5. The size of the image frame is another factor that defines the highest possible flow rate. In case the flow rate is so high that successive images no longer show the same view, the correlation between the images will have no clear maximum point and the measurement does not give a sensible result.

The window 3 can be such that it is complemented with a prism-like part, as appears from the application of FIGS. 1 and 2. The prism-like part makes it possible to implement the illumination in a smaller space. For the same purpose it is possible to use, additionally or solely, mirrors that direct the light to the material to be measured. Also, by cutting, for example, it is possible to form a recess in the window 3, wherefrom the light of the light source 5 will be applied to the measuring area. An application of this kind is shown in FIG. 4. A sufficiently large viewing glass, to which is not added a prism-like part or mirror-like parts, can also serve as the window 3. An application of this kind is shown in FIGS. 5 and 6.

Electronic elements for signal processing calculate the maximum point of correlation between the images. Calculation is performed by fast signal processing technology, the speed of which does not limit the highest flow rate to be measured with the device. The processing can be carried out either immediately in the device in connection with the camera or in a separate signal processing unit, or on a computer. For correlation calculation there exist a plurality of known algorithms.

The protective casing 10 can be arranged to prevent access of an external, disturbing light to the camera 1.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method for measuring a flow rate of optically non-homogeneous material in a process pipe, the method comprising:
   illuminating a measuring area of the optically non-homogeneous material in the process pipe, through a window in the process pipe that is in contact with the non-homogeneous material, with a light source;
   imaging with a camera, through the same window in the process pipe, illuminated non-homogeneous material in the process pipe wherein the camera and the light source are arranged on a same side of the process pipe;
   determining through correlation between temporally successive images, travel performed by the non-homogeneous material in the process pipe between capture of temporally successive images; and
   determining a velocity of the non-homogeneous material in the process pipe by a time difference between the successive images and the travel.

2. The method of claim 1, comprising:
   calculating a two-dimensional correlation between the temporally successive images; and
   calculating a distance travelled by the non-homogeneous material at an interval between successive images at a maximum point of correlation.

3. The method of claim 1, comprising:
   calculating a two-dimensional correlation between the temporally successive images; and
   calculating a direction of travel performed by the non-homogeneous material at an interval between successive images at a maximum point of correlation.

4. The method of claim 1, comprising:
   determining an amount of turbulence in the non-homogeneous material based on a degree of correlation.

5. The method of claim 1, wherein the measuring area of the non-homogeneous material is substantially uniformly illuminated.

6. An arrangement for measuring a flow rate of optically non-homogeneous material in a process pipe, comprising:
   a light source for illuminating a measuring area of non-homogeneous material in the process pipe through a window arranged in the process pipe that will contact with the non-homogeneous material during measurement;
   a camera for imaging, through the same window in the process pipe, illuminated non-homogeneous material in the process pipe wherein the camera and the light source are arranged on a same side of the process pipe; and
   means for determining, through correlation between temporally successive images, travel performed by the non-homogeneous material in the process pipe between capture of temporally successive images and for determining a velocity of the non-homogeneous material in the process pipe by a time difference between the successive images and the travel.

7. The arrangement of claim 6, wherein the means for determining is configured for calculating a two-dimensional correlation between successive images for calculating a distance travelled performed by the non-homogeneous material at an interval between the successive images at a maximum point of correlation.

8. The arrangement of claim 6, wherein the means for determining is configured for calculating a two-dimensional correlation between successive images and for calculating a direction of travel performed by the non-homogeneous material at an interval between the successive images at a maximum point of correlation.

9. The arrangement of claim 8, wherein the means for calculating the correlation determine an amount of turbulence in the non-homogeneous material based on a degree of the correlation.

10. The arrangement of claim 6, wherein the light source is configured to illuminate the measuring area of the non-homogeneous material substantially uniformly.

11. The arrangement of claim 6, comprising:
    a mirror for transmitting light from the light source to the window.

12. The arrangement of claim 11, wherein the mirror is arranged for directing light to a beveled surface formed in the window.

13. The arrangement of claim 12, wherein the light source is arranged on the beveled surface formed in the window.

14. The arrangement of claim 6, wherein the window comprises:
    a viewing glass in the process pipe.

* * * * *